United States Patent [19]

Borgendale et al.

[11] Patent Number: 5,734,568
[45] Date of Patent: Mar. 31, 1998

[54] DATA PROCESSING SYSTEM FOR MERGER OF SORTING INFORMATION AND REDUNDANCY INFORMATION TO PROVIDE CONTEXTUAL PREDICTIVE KEYING FOR POSTAL ADDRESSES

[75] Inventors: Kenneth W. Borgendale, Gentofte, Denmark; Walter S. Rosenbaum, Paris, France

[73] Assignee: International Business Machines Corporation, Armonk, N.Y.

[21] Appl. No.: 933,421

[22] Filed: Aug. 21, 1992

[51] Int. Cl.⁶ .................... G06F 17/60; G06G 7/48
[52] U.S. Cl. .................................................. 364/409
[58] Field of Search .............................. 209/384, 900; 382/1, 13, 57; 364/419.15, 478, 401; 395/149

[56] References Cited

U.S. PATENT DOCUMENTS

| | | | |
|---|---|---|---|
| 4,396,992 | 8/1983 | Itayashi et al. | 364/419.15 |
| 4,632,252 | 12/1986 | Haruki et al. | 209/546 |
| 4,739,479 | 4/1988 | Tamada et al. | 364/409 |
| 4,921,107 | 5/1990 | Hofer | 209/456 |
| 5,031,223 | 7/1991 | Rosenbaum et al. | 382/1 |
| 5,210,689 | 5/1993 | Baker et al. | 364/419.01 |
| 5,420,403 | 5/1995 | Allum et al. | 235/375 |

FOREIGN PATENT DOCUMENTS

| | | | |
|---|---|---|---|
| 2106679 | 4/1983 | United Kingdom | G06K 1/12 |

OTHER PUBLICATIONS

*Newsletter for Ordermation*, Mar. 24, 1984, "Announcing the Address Locator".

Everest, *Database Management*, McGraw–Hill Book Co., 1986, p. 746.

Technical Disclosure Bulletin, A. Arellano, et al., "Word Generation System for Typist," vol. 17, No. 8, 1/75, p. 2422.

Technical Disclosure Bulletin, A. H. Ett, et al., "Apparatus for OCR Postal Address Code Determination," vol. 17, No. 4, 9/74, p. 1201.

Technical Disclosure Bulletin, R. E. Shipway, et al., "Data Validation and Correction by Context,"vol. 14, No. 4, 9/71, p. 1132.

Technical Disclosure Bulletin, S. J. P. Todd, "Abbreviated Typing for Word Processing,"vol. 21, No. 9, 2/79, p. 3796.

*Primary Examiner*—Gail O. Hayes
*Assistant Examiner*—Charles R. Kyle
*Attorney, Agent, or Firm*—Edward H. Duffield; Joseph C. Redmond, Jr.

[57] ABSTRACT

A data processing system and method for the correction of address information on mail. The method makes use of a contextual predictive keying method for enabling an operator to read the image of an addressee mailing address and type in a minimum number of keystrokes necessary to sort the mail piece down to the final sorting level at the destination post office.

16 Claims, 14 Drawing Sheets

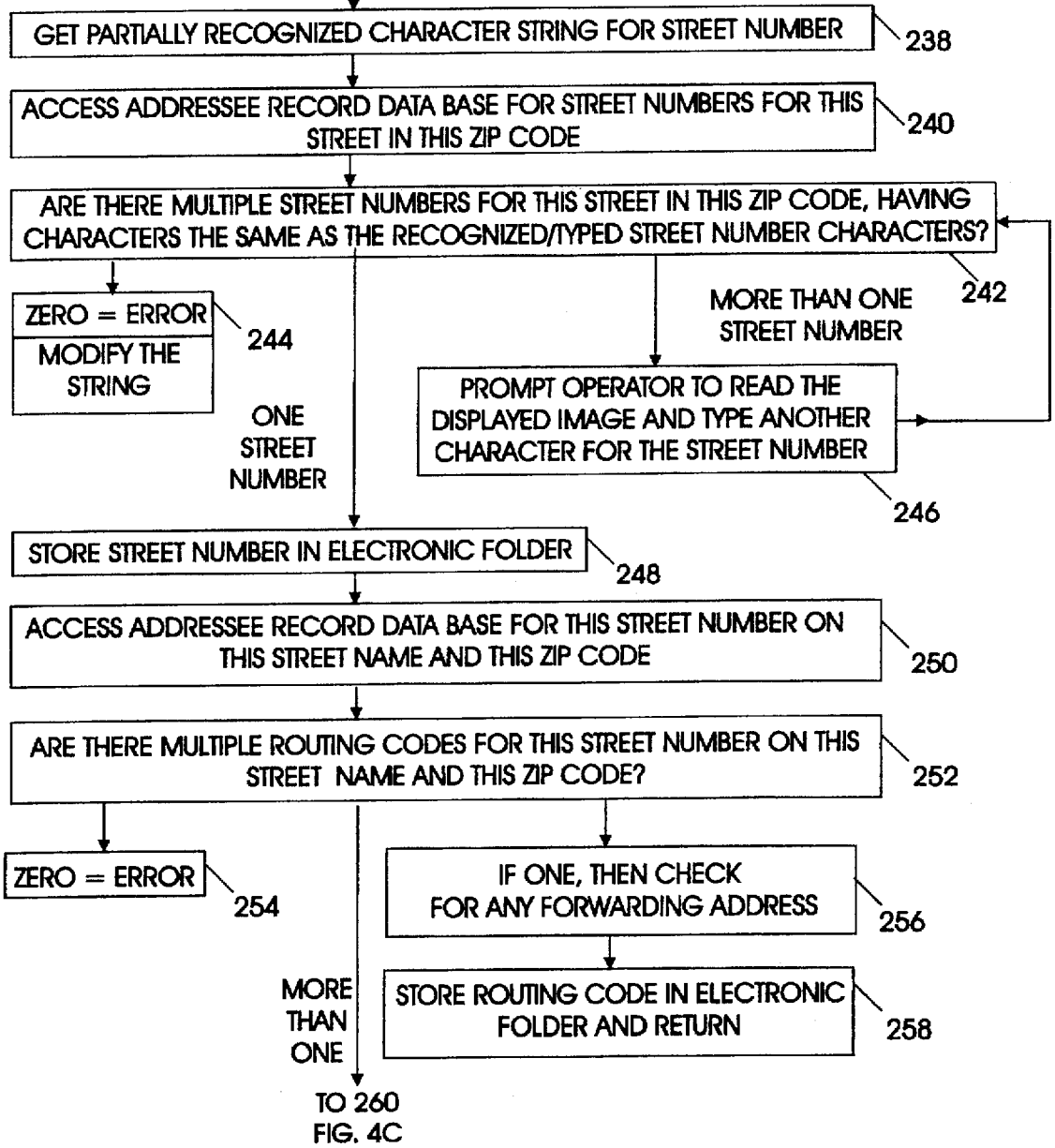

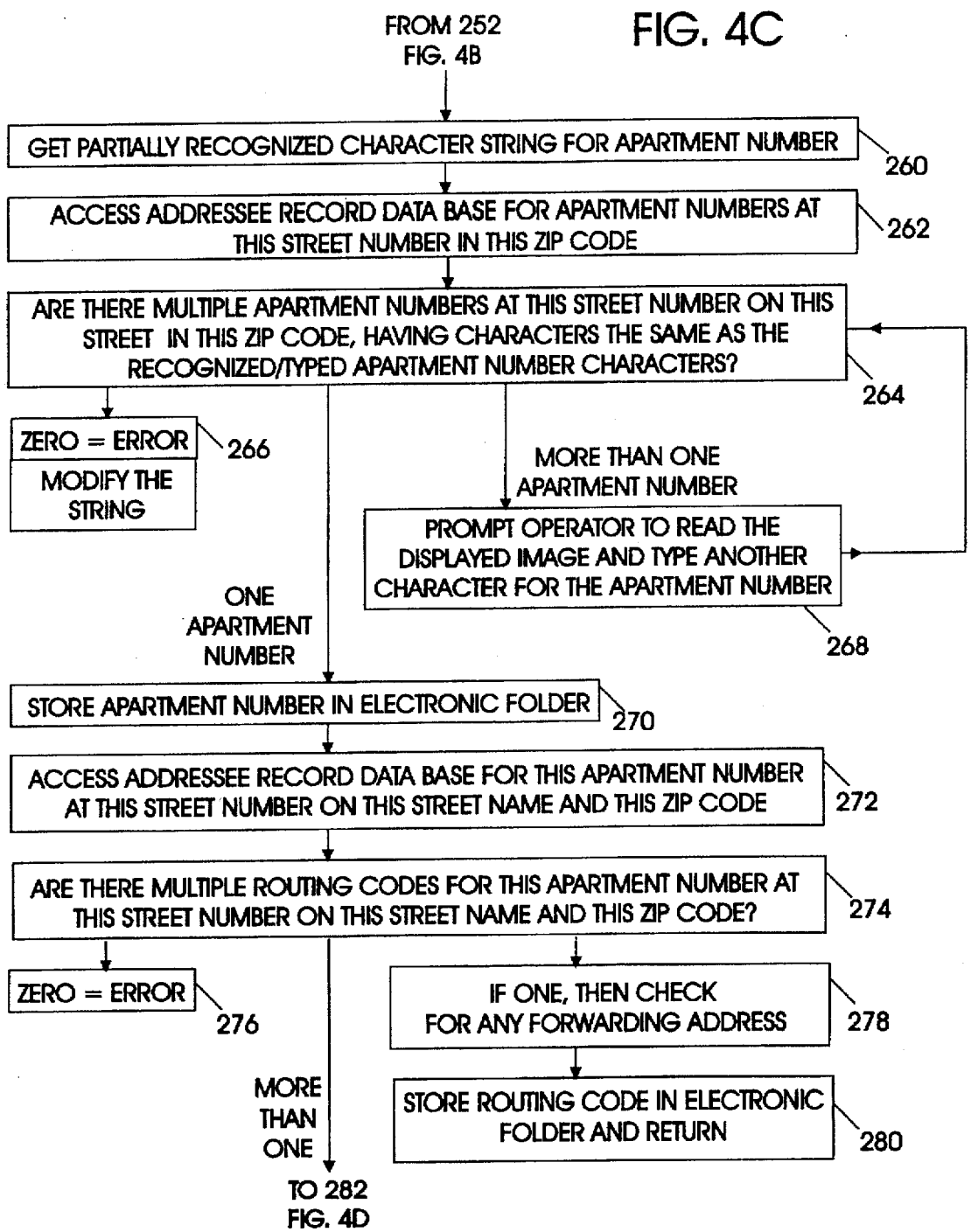

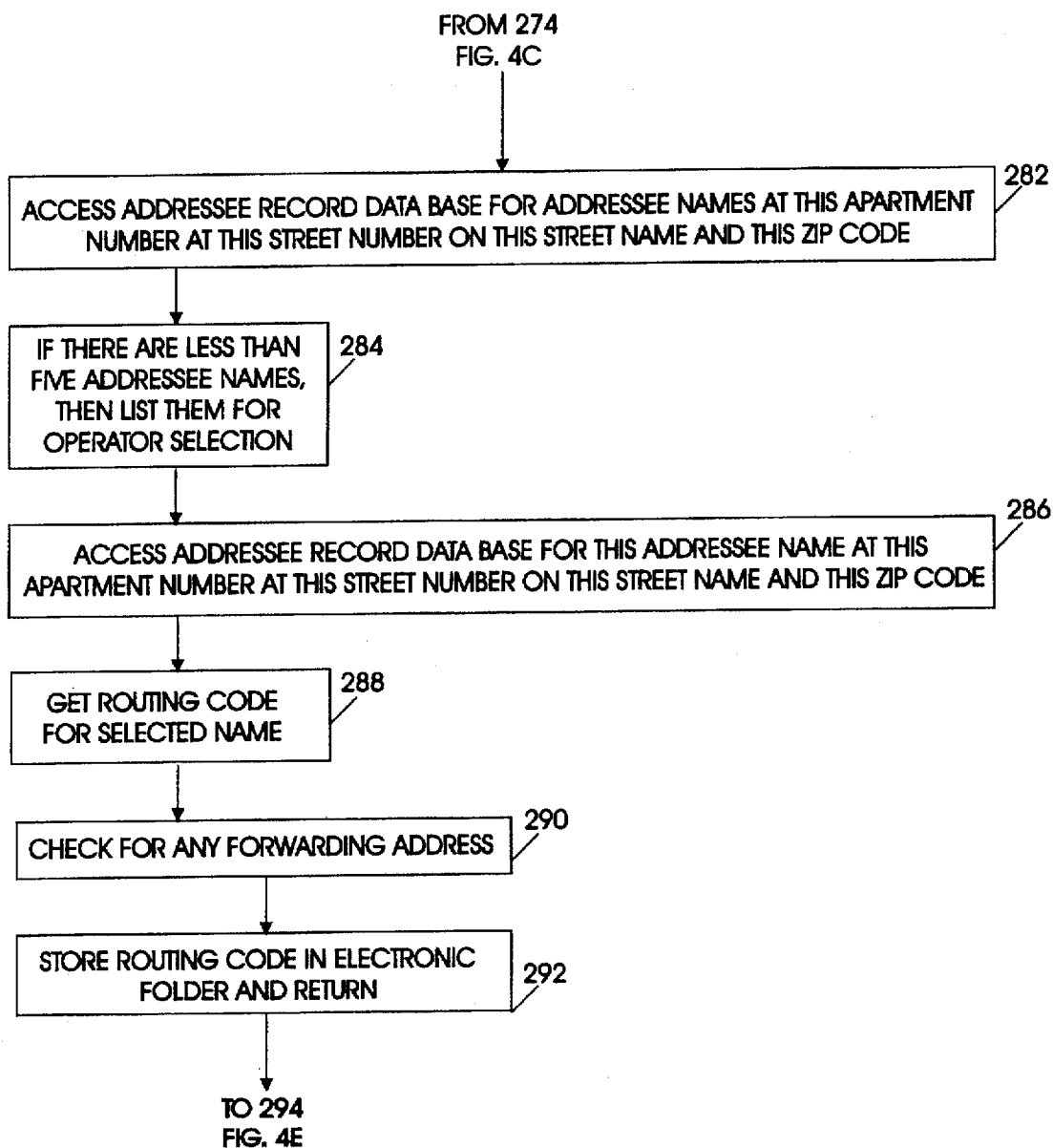

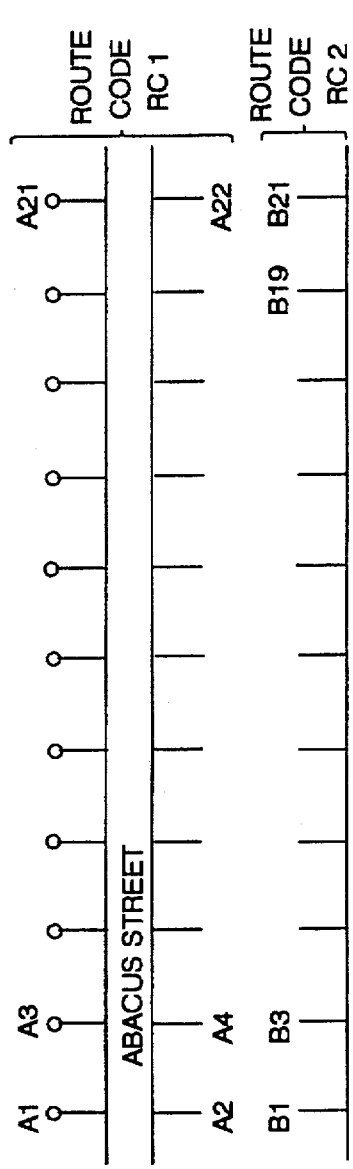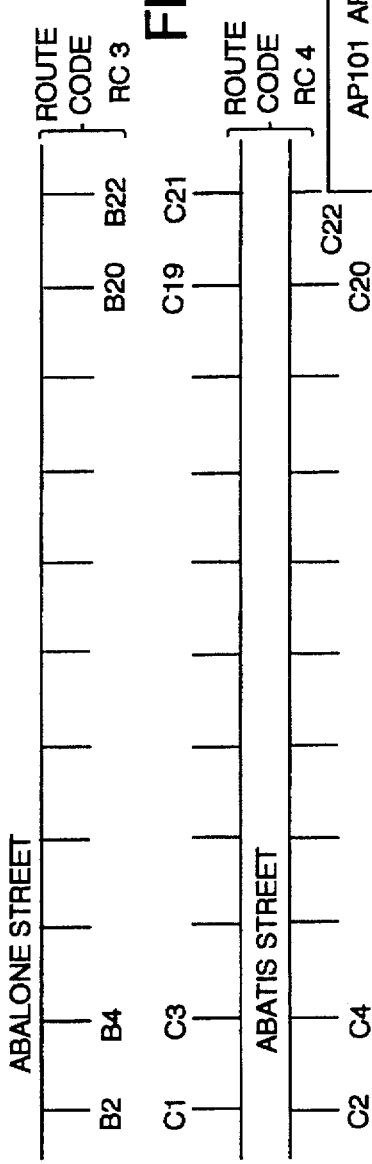

DATA PROCESSING SYSTEM FOR MERGER OF SORTING INFORMATION AND REDUNDANCY INFORMATION TO PROVIDE CONTEXTUAL PREDICTIVE KEYING FOR POSTAL ADDRESSES

BACKGROUND OF THE INVENTION

1. Technical Field

The invention disclosed broadly relates to computer assisted mail processing and more particularly relates to the use of address data sufficiency information stored in a data base for use in minimizing the keystrokes of an operator inputting routing information.

2. Background Information

U.S. Pat. No. 5,031,223, entitled "System and Method for Deferred Processing of OCR Scanned Mail" by Walter S. Rosenbaum, et al., assigned to the IBM Corporation, is incorporated herein by reference.

The process of deferred processing of OCR scanned mail is based on the concept of "just-in-time manufacturing" as applied to the sorting information required to complete delivery after a physical mail piece is received at a destination postal location. In the Rosenbaum, et al. patent, a physical mail piece is input at the sending postal location and has its front face scanned with an image capturing device to provide a digitized image of at least the destination address block for a mail piece. If the address block is machine readable, a character recognition system analyzes at least the state and city information or the zip code information in the destination address block of the image, providing an alphanumeric string of recognized information representing the city, state and/or zip code for the intended destination of the mail piece. If the address block is not machine readable, for example because it is a handwritten cursive script, then an operator will view the captured image of the address block and will rekey the city, state and zip code, providing the alphanumeric string. With this amount of information, .the physical mail piece can be forwarded for physical delivery on a truck, airplane or other conveyance and the process of character recognition for the balance of the destination address block can be deferred. As a part of the process of capturing the image of the destination address block, a serial number is assigned to the physical mail piece and is associated with the captured image in a mail piece electronic folder. The value of the serial number is encoded in barcode form on the mail piece at the sending location. In this manner, the physical mail piece and the electronic folder can be related at the destination postal location.

In the Rosenbaum, et al. patent, while the physical mail piece is in transit from the sending location to the destination location, some or all of the balance of the address information in the image of the address block will be character recognized, if the address block is machine readable. If the address block is not machine readable, for example because it is a handwritten cursive script, then an operator will view the captured image of the address block and will rekey some or all of the balance of the address information in the image of the address block. All of the character recognized or rekeyed alphanumeric strings are incorporated into the mail piece electronic folder and transmitted to the destination postal location over a data communications network.

When the physical mail piece is received at the destination postal location, its barcode serial number is read from the front of the mail piece and used as a query term for accessing from the data communications network, the portion of the mail piece electronic folder containing the balance of the character recognized information sufficient to perform sorting of the physical mail piece at the destination postal location. In the Rosenbaum, et al. patent, the barcoded serial number is read from the front of the mail piece, the system accesses the character recognized information from the system and that character recognized information is used to drive a mechanical sorting device to sort the physical mail piece into the appropriate sorting scheme for further mechanical delivery stages.

What is needed in the prior art is an improved means for minimizing the keystrokes of the operator in the address rekey operation described in the Rosenbaum, et al. patent, so that when sufficient information has been manually keyed in to deliver the mail piece, the operator can stop keying.

OBJECTS OF THE INVENTION

It is therefore an object of the invention to provide an improved technique for processing OCR scanned mail.

It is another object of the invention to provide improved technique for manually correcting OCR misreads of mail addresses.

It is another object of the invention to provide an improved technique for correcting OCR misread mail sufficient to deliver it down to carrier Walk sequence.

It is still a further object of the invention to provide an improved technique for correcting OCR misread mail using address sufficiency data for mail being directed to particular recipients at the destination region.

SUMMARY OF THE INVENTION

These and other objects, features and advantages of the invention are disclosed herein. A data processing system, method and program are disclosed to optimize mail piece address correction sufficient to map the mail down to the carrier walk sequence. In accordance with the invention, an address kernel is determined by the system to be either sufficient or not sufficient in accomplishing a sorting of the mail piece down to the mechanical final sort level at the destination post office. The address kernel may be sufficient for the purpose of sorting to a residential neighborhood having a sparse population, but the same address kernel for the same addressee may be insufficient to deliver a mail piece to that addressee at his business's address, which is in a more densely populated neighborhood. The more densely populated neighborhood will, typically, be subject to a finer sorting breakout requiring information from additional lines of the address on the mail piece to achieve a mechanical sort down to the final sorting level.

In order to accomplish this, the invention provides a rekeying station with access to the final level sorting information for all destination postal offices. In order to achieve this, an address directory stored in the host system is organized by addressee records. Each record can include data fields for the state, city, zip code, street name, street number, building floor, company name, and/or office number for a postal addressee. In addition, each addressee record includes route code information for the destination location. A contextual predictive keying computer method interacts with the operator, in accordance with the invention, and accesses the addressee records to indicate which combinations of the respective data fields in the addressee record will provide the unique, sufficient information to mechanically sort down to the final sorting level.

In an alternate embodiment, the address directory with the route code information can be stored in a distributed manner at each rekeying station or in a storage server at a local area network which includes several rekeying stations. The distributed storage can be periodically updated by downloading new addressee information from the host.

DESCRIPTION OF THE FIGURES

These and other objects, features and advantages of the invention will be more fully appreciated with reference to the accompanying figures.

DISCUSSION OF THE PREFERRED EMBODIMENT

Figure 1:
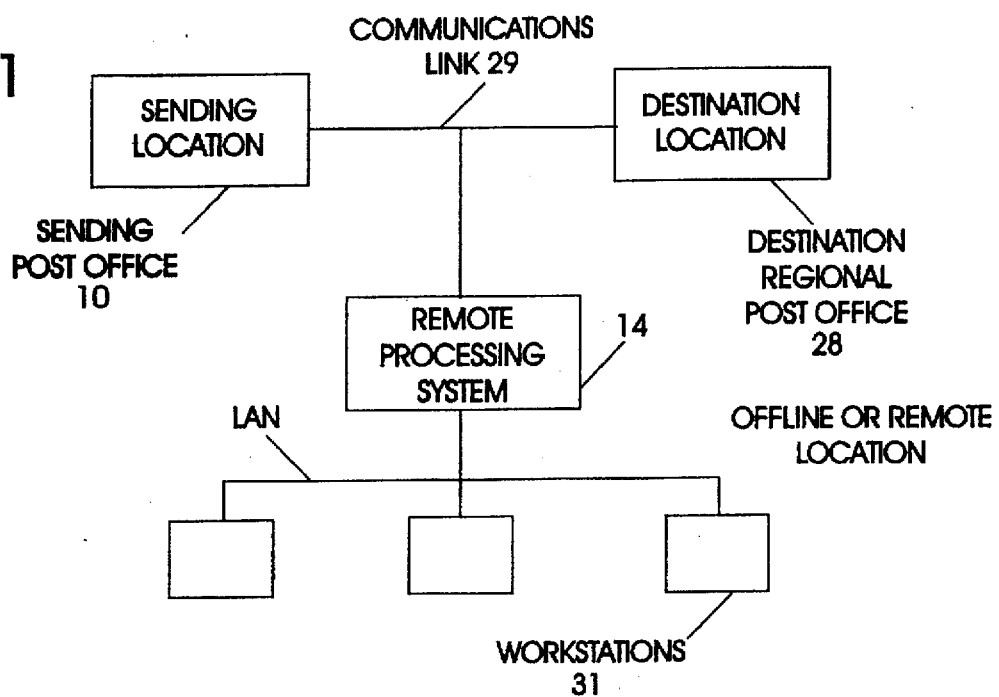
FIG. 1 is a network block diagram showing the relationship between the sending location, the remote processing system and the destination location.
Figure 5:
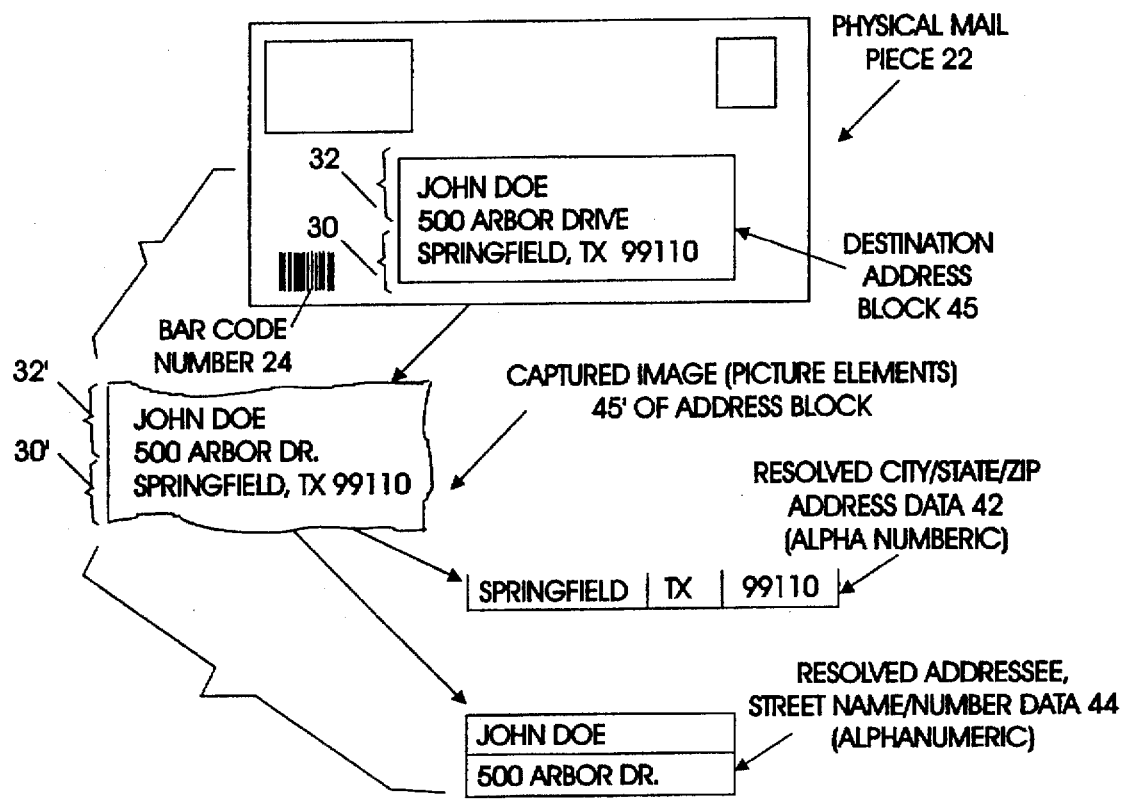
FIG. 5 illustrates the relationship between the destination address block on the physical mail piece and the resolved city, state, zip address data.

The contextual predictive keying method of the invention, finds application in the remote processing system 14 of the postal network shown in FIG. 1. The postal network of FIG. 1 is described in greater detail in the U.S. Pat. No. 5,031,223 by Rosenbaum, et al. cited above, and incorporated herein by reference. The sending location 10 is a sending post office, which receives a physical mail piece 22. The mail piece 22 shown in FIG. 5, will have a destination address block 45. The destination address block will include a printed addressee name and street name and street number 32 and it will also include a printed destination city, state and zip code information 30. As is described in the Rosenbaum, et al. patent, each mail piece processed by the sending post office 10 will have an identifying number 24 applied to the mail piece, typically printed as a barcode. The identifying number can represent a serial number or other number Which will identify the mail piece.

Then, as described in the Rosenbaum, et al. patent, a digital image of the mail piece is captured, which includes an image of the addressee name, street name and street number 32' as well as an image of the addressee street name, number and zip code 30'. As is described in the Rosenbaum, et al. patent, a first stage character recognition operation is performed on the image of the city, state and zip code 30', in an attempt to identify the destination and regional post office 28 in FIG. 1, to which the physical mail piece 22 is to be transported. Transportation for the physical mail piece 22 will be by truck, airplane, or other common carrier.

Figure 6:
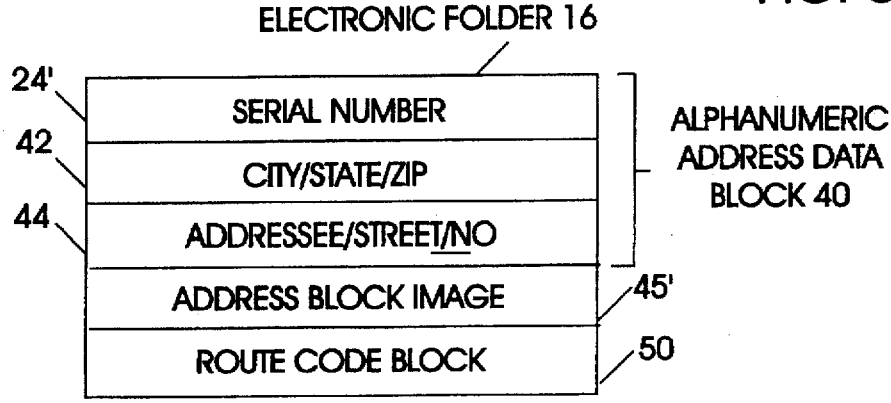
FIG. 6 illustrates the electronic mail piece folder.

Then, as is described in the Rosenbaum, et al. patent, an electronic mail piece folder 16, as shown in FIG. 6, will be assembled by the data processing system, a portion of which is located at the sending post office 10. The mail piece electronic folder 16 will include information such as the alphanumeric characters for the serial number 24' which is the numerical value of the number 24 printed on the front of the mail piece 22. Also included in the electronic mail piece folder 16 is the alphanumeric representation of the city, state and zip code 42 which is obtained from character recognition of the image 30' of the captured image of the destination address block, the image being 45'. The alphanumeric characters for the addressee name, street name and number 44 will have a space available for it in the mail piece electronic folder 16, however, as explained in the Rosenbaum, et al. patent, the image of addressee name, street name and number 32' is not yet character recognized by the system. Therefore the portion 44 of the mail piece electronic folder 16 will be empty at the sending post office 10. Optionally, the captured image 45' of the address block 45 can also be included in the mail piece electronic folder 16.

Figure 7:
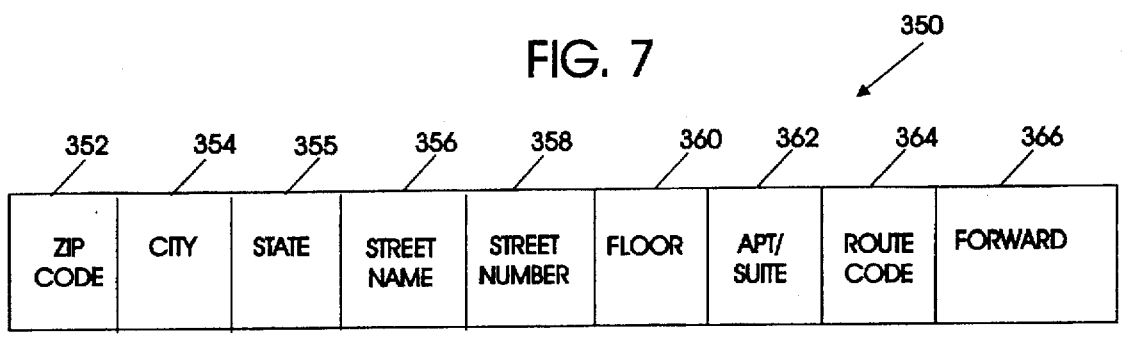
FIG. 7 is the format of an entry in the addressee record data base.

In accordance with the invention, an additional space is provided for route code block 50 in the mail piece electronic folder 16. This space will be filled with a route code 364 at the remote processing system 14, as shown in FIG. 7.

As is described in the Rosenbaum, et al. patent, enough information as to the state, city and zip code is character recognized from the captured image 45' to enable the routing and transportation of the physical mail piece 22 by a public carrier to the destination regional post office 28. While the physical mail piece 22 is in transit, the mail piece electronic folder 16 is transmitted from the sending post office 10 to the remote processing system 14, as is described in the Rosenbaum, et al. patent.

Figure 2:
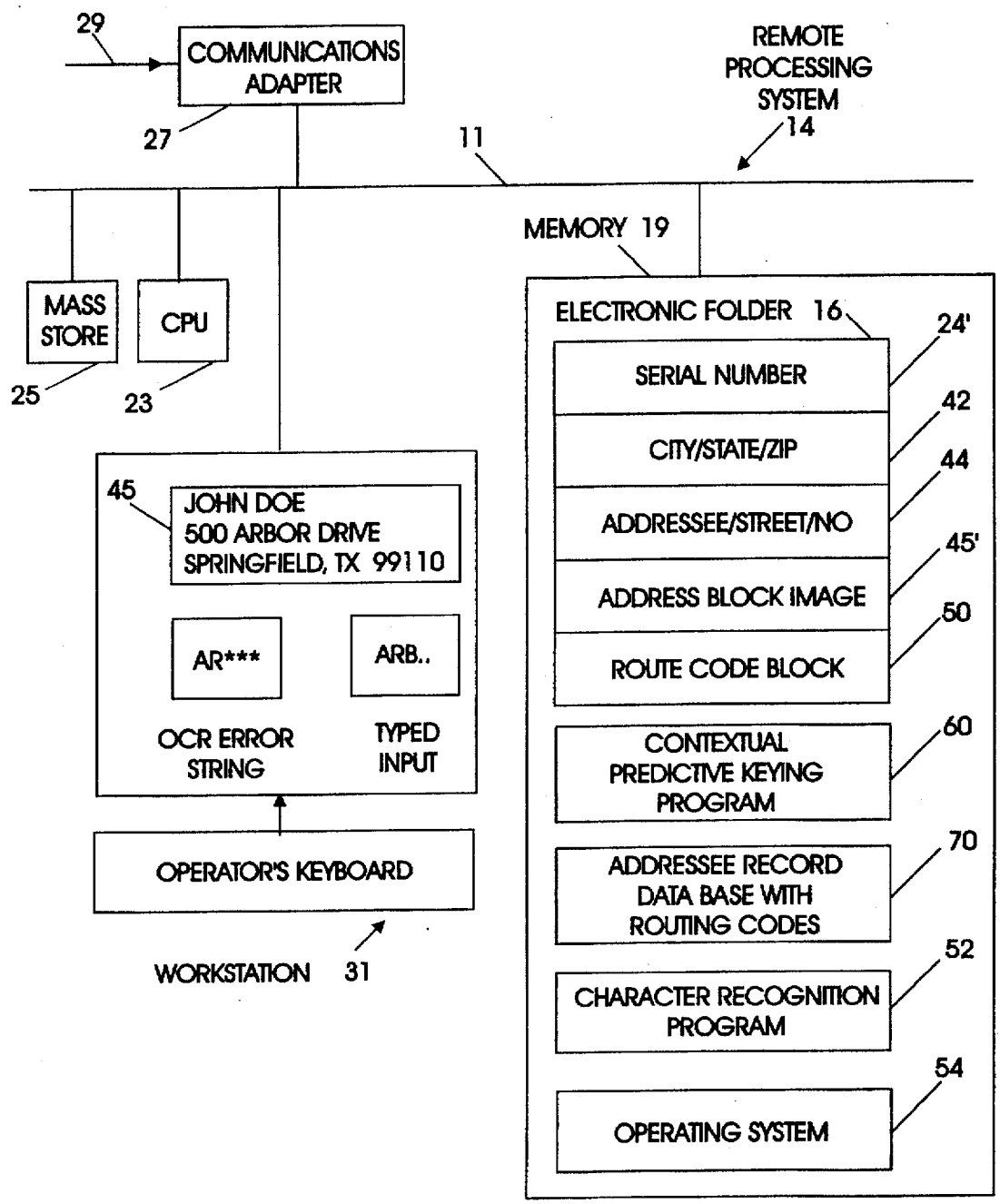
FIG. 2 is a functional block diagram of the remote processing system 14.

FIG. 2 shows a more detailed functional block diagram of the remote processing system. The data communications link 29 inputs the mail piece electronic folder 16 through the communications adapter 27 to the remote processing system. The remote processing system 14 includes a memory 19 coupled by means of the bus 11 to the communications adapter 27. Also included in the remote processing system 14, is the CPU 23 and the mass store 25 which are coupled to the bus 11.

A plurality of workstations 31 are coupled to the bus 11, where operators will be available to provide operator assist in the recognition of the addressee, street name and street number information from the captured image 45' which is in the captured image of address block 45 of the mail piece electronic folder 16.

The remote processing system 14 has the memory 19 which includes a storage partition for the mail piece electronic folder 16, it includes an operating system program 54, and a character recognition program 52. As is described in the Rosenbaum, et al. patent, the character recognition program 52 will attempt to automatically character recognize the street name and street number data and optionally the addressee name 32 from the captured image 45'. If the character recognition of the addressee name and/or the street name and street number are successful by the character recognition program 52, then the alphanumeric strings resulting from that recognition operation are added to the mail piece electronic folder 16 in the partition 44 in FIG. 6.

However, if the character recognition program 52 is not able to resolve some of the information in the captured image address block 45', then the operator assist mode is invoked. In the operator assist mode, the captured image of the address block 45 is displayed on a display screen at a workstation 31 to an operator. Also displayed to the operator is the portion of the alphanumeric strings in the city, state, zip 42 and/or the addressee street name, street number 44 which have been fully resolved or partially resolved by the character recognition program 52. This is shown in the Rosenbaum, et al. patent.

Figure 4A:
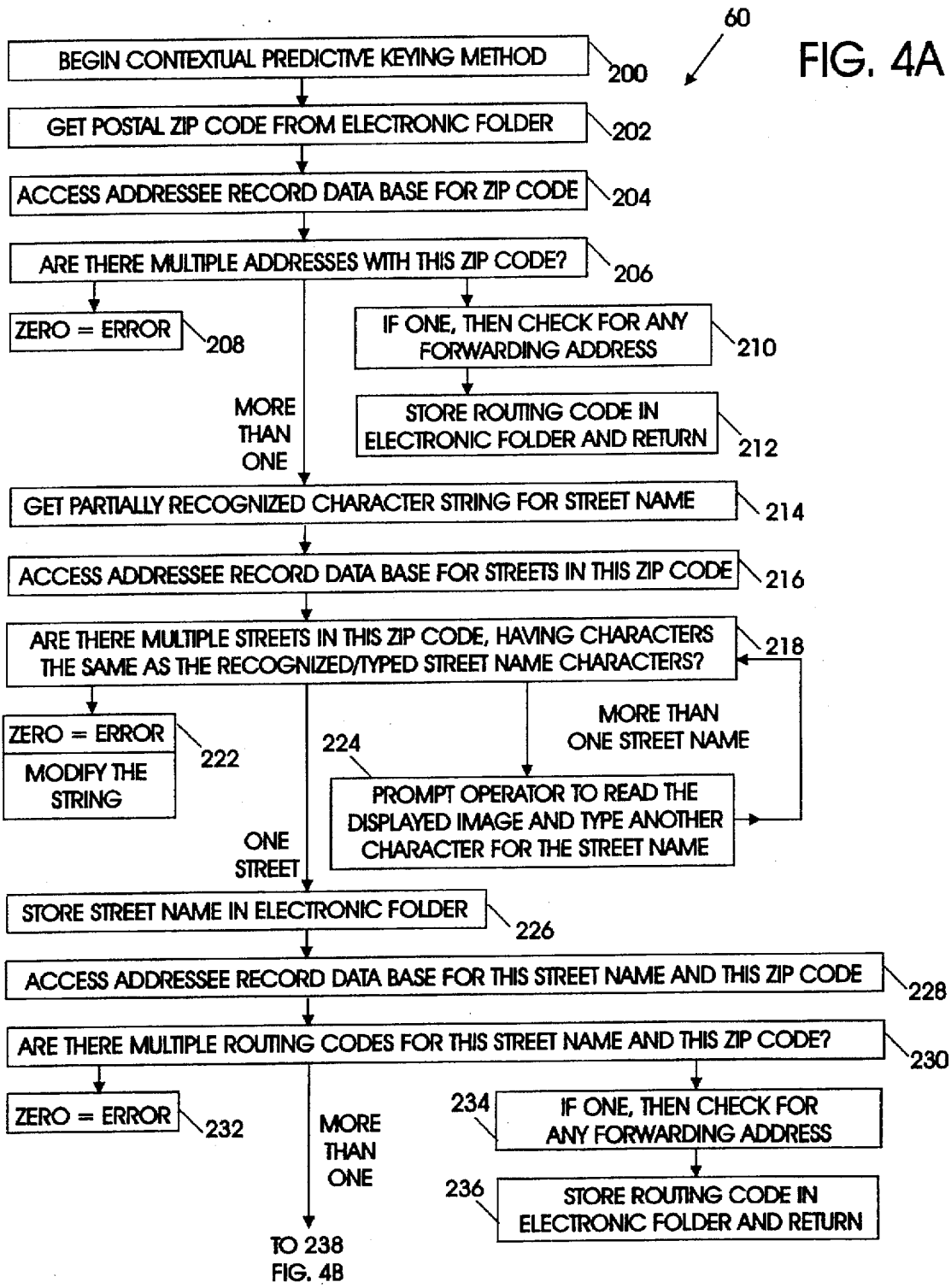
FIG. 4 consists of FIGS. 4A, 4B, 4C, 4D and 4E, and is a flow diagram of the contextual predictive keying method, in accordance with the invention.
Figure 4E:
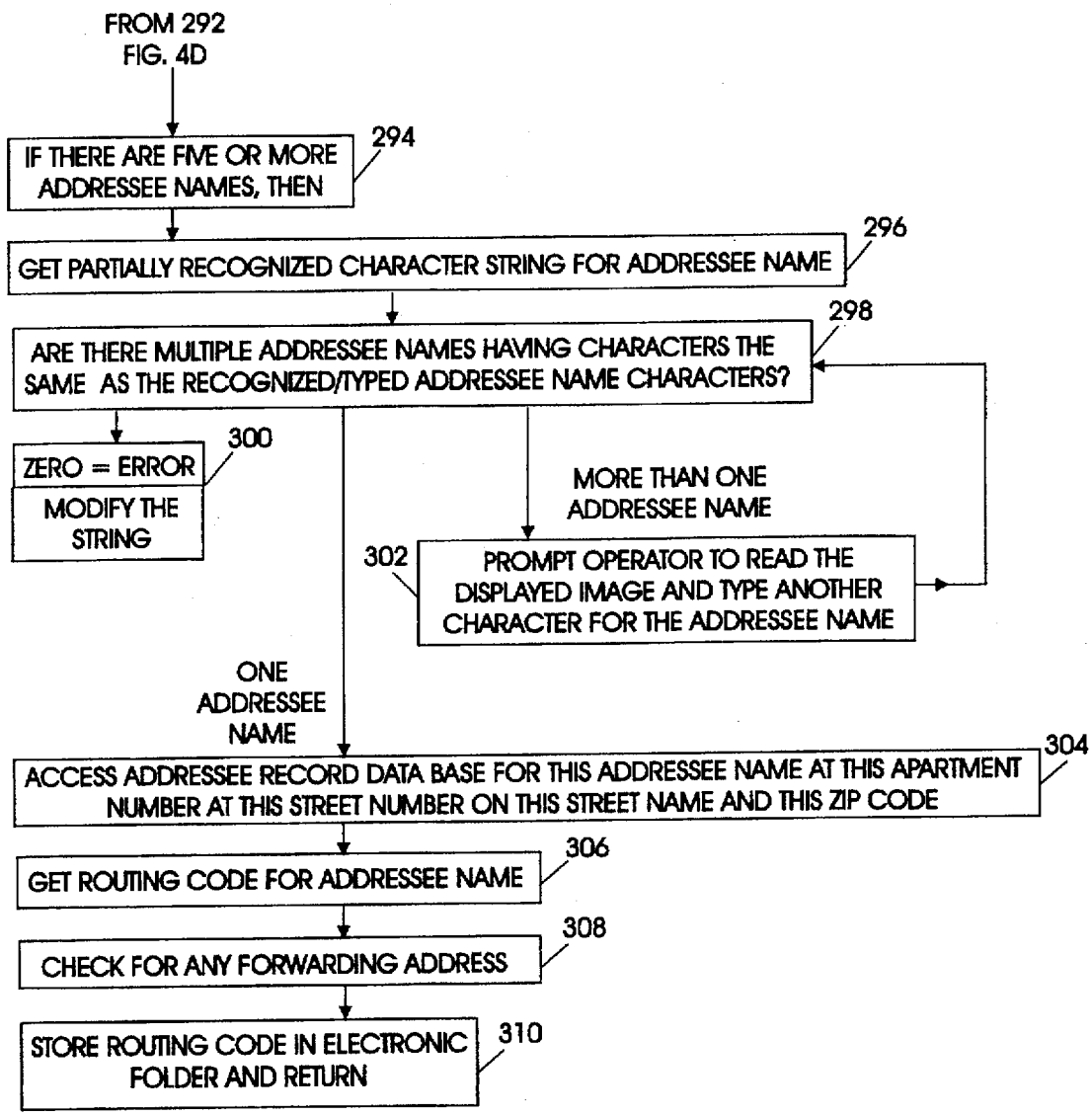

In accordance with the invention, a contextual predictive keying program 60 is included in the memory 19 of the remote processing system 14. A flow diagram of the sequence of operational steps for carrying out the contextual predictive keying program 60 is shown in FIG. 4 is included in the memory 19 of the remote processing system 14 of FIG. 2. An example of the addressee record data base with routing code 70 is shown in Table 1.

In accordance with the invention, as the operator at a workstation 31 is typing in a portion of the misrecognized addressee name or street name or street number or possibly the misrecognized city or state information, the contextual predictive keying program 60 uses the addressee record data base with routing codes 70, to determine when only the necessary information is input by the operator at the workstation 31 to sort the mail piece at the destination regional post office. When a sufficient amount of information has been entered by the operator at workstation 31 to accomplish this purpose, no further information is necessary and the routing code corresponding to the destination regional post office sorting requirements, is entered into the routing code block 50 in the mail piece electronic folder 16 in the memory 19 of FIG. 2.

Figure 3C:
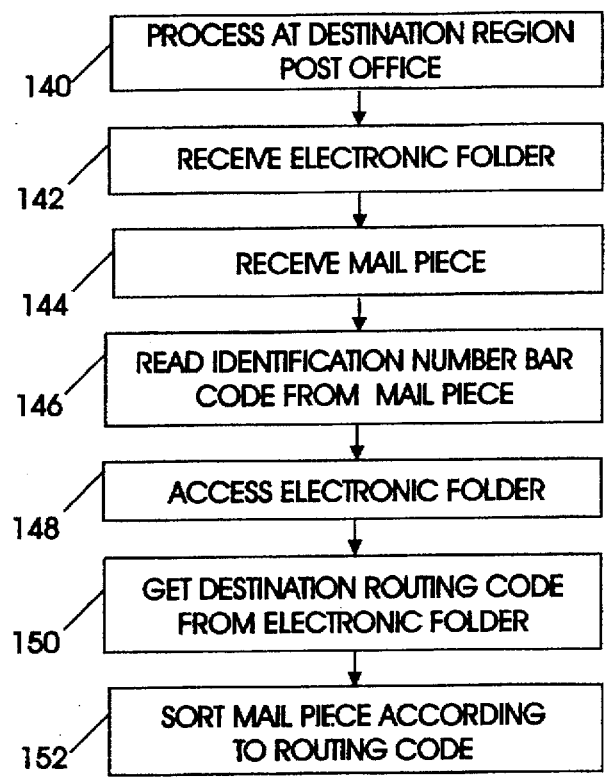
FIG. 3C is a flow diagram of the process at the destination region post office 28.
Figure 3A:
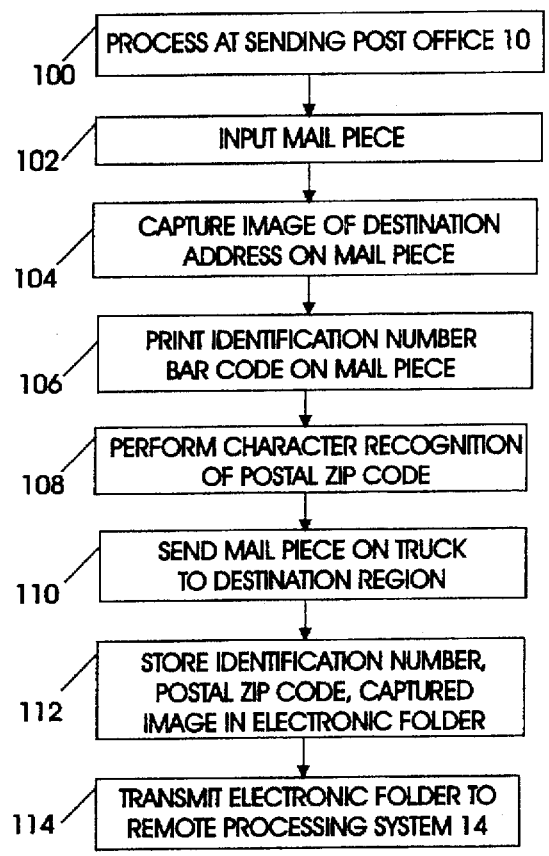
FIG. 3A is a flow diagram of the process at the sending post office 10.
Figure 3B:
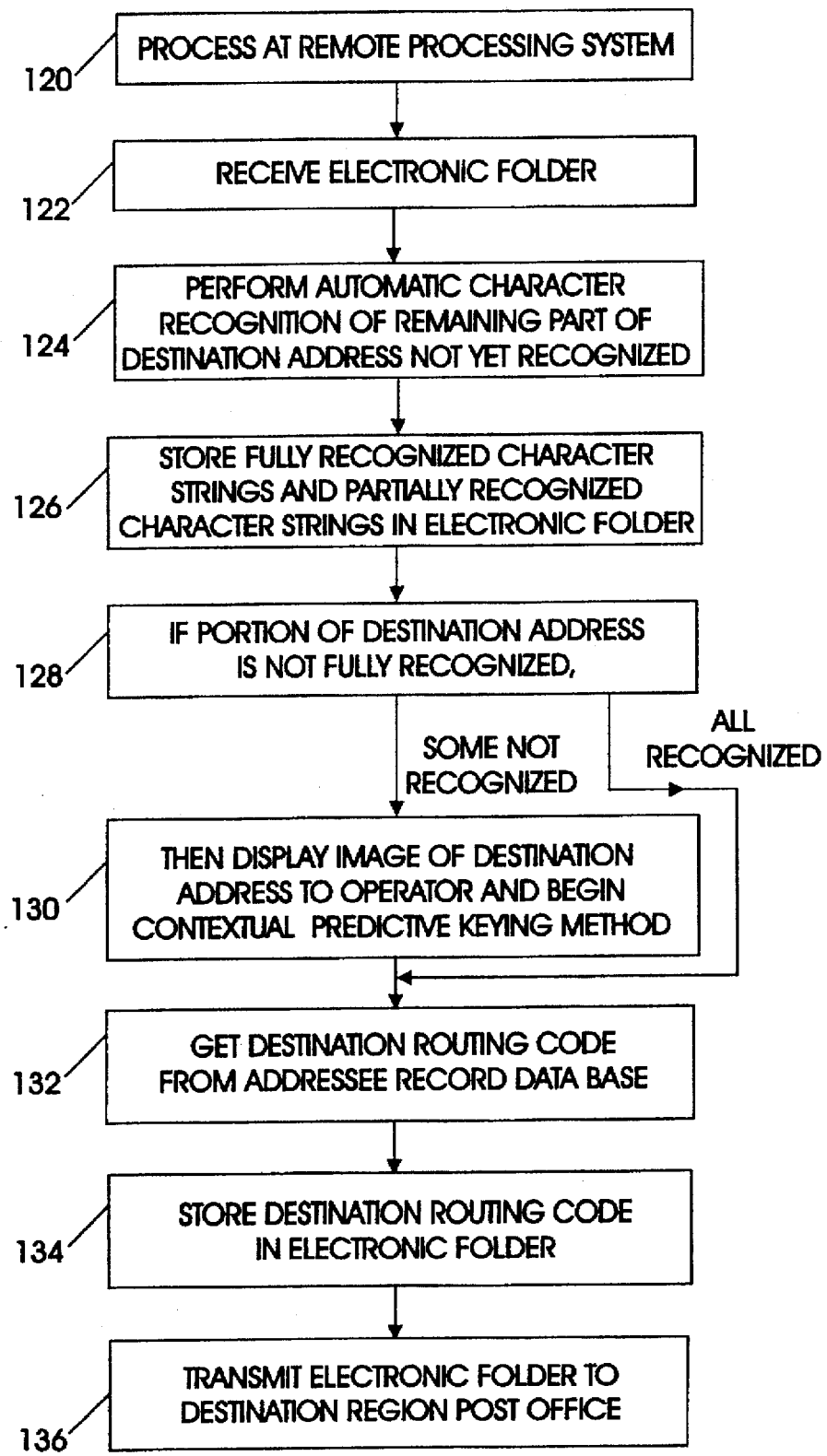
FIG. 3B is a flow diagram of the process at the remote processing system

Having now outlined the overall operation of the invention within the context of the Rosenbaum, et al. patent, reference is made to the three flow diagrams in FIGS. 3A, 3B and 3C, to give a further understanding of the operation of the system at the sending location 10, the remote processing system 14, and the destination regional post office 28, respectively.

FIG. 3A shows an outline flow diagram of the process at the sending post office 10. The process starts at step 100 and transitions to step 102 which inputs the mail piece 22. Then in step 104, the image 45' of the destination address block is captured from the mail piece 22. Then in step 106, the identification number 24 is printed, typically with a barcode, onto the mail piece 22. Then in step 108, character recognition is performed for at least the postal zip code in the city, state, zip portion 30' of the captured image 45'. Based upon the recognized postal zip code and possibly additional information such as the state name and city name, the mail piece 22 is transported by means of a common carrier to the destination regional post office 28. Then in step 112 of FIG. 3A, the identification number 24' and the postal zip code from the captured image 45' are stored in partitions and 42 of the mail piece electronic folder 16. Then in step 114, the mail piece electronic folder 16 is transmitted over the communications link 29 to the remote processing system.

Reference is now made to FIG. 3B which illustrates the overall process at the remote processing system 14. The process begins at step 120 and transitions to step 122 which receives the electronic folder 16. Then in step 124, automatic character recognition is performed using character recognition program 52, for the remaining portion of the destination address not yet recognized from the captured image 45'.

The process of FIG. 3B the transitions to step 126, which stores the fully recognized character strings and the partially recognized character strings in the mail piece electronic folder 16 in the memory 19 of the remote processing system.

Then in step 128, if a portion of the destination address is not fully recognized by the character recognition program 52 from the captured image 45', then the program transitions to step 130. In step 130, if some of the destination address in the captured image 45' is not recognized by the character recognition program 52, then the image of the destination address from the captured image address block 45, is displayed to the operator at workstation 31. Also, the contextual predictive keying method 60 is begun.

The result of the contextual predictive keying method 60, which interacts with the address record data base 70, is the production of a routing code. That routing code is sufficient to enable a complete sorting of the mail piece at the destination regional post office 28. The program now transitions to step 132. Step 128 directly transitions to step 132 is all of the portions of the destination address in the captured image 45' are successfully recognized by the character recognition program 52. In step 132, the destination routing code is obtained from the addressee record data base with routing codes 70. In step 134, the destination routing code is then stored in the routing code block 50 of the electronic mail piece folder 16 in memory 19 of the remote processing system 14. Then in step 136, the electronic folder 16 is transmitted to the destination regional post office 28.

FIG. 3C illustrates an outline of the method carried out at the destination regional post office 28. The flow diagram of FIG. 3C begins with step 140 which transitions to step 142 which receives the electronic mail piece folder 16 from the remote processing system 14. Step 144 then receives the physical mail piece 22 from the common carrier. Then in step 146, the identification number 24 imprinted on the front of the physical mail piece 22 is read, typically with a barcode reader. Then in step 148, the mail piece electronic 16 which has been received at the destination location 28 from the remote processing system 14, is accessed. Then in step 150, the destination routing code is extracted from the routing code block 50 in the mail piece electronic folder 16. Then in step 152, the mail piece 22 is sorted at the destination regional post office 28, using the routing code obtained from the route code block 50.

A more detailed description of the contextual predictive keying method is shown in FIG. 4. FIG. 4 is a flow diagram of the sequence of operational steps for a program stored in the memory 19 of the remote processing system 14. The program of executable commands is executed by the CPU 23 shown in FIG. 2.

FIG. 4 shows the flow diagram which begins at step 200, beginning the contextual predictive keying method. This is the method which is embodied in the program 60 stored in the memory 19 of FIG. 2.

Step 202 gets the postal zip code from the electronic folder. Step 204 accesses the addressee record data base 70 for the zip code. Step 206 determines if there are any multiple addresses with this zip code. If the number of addresses for this zip code is zero, then step 208 indicates there is an error. If there is one address for this zip code, then step 210 checks if there are any forwarding addresses stored in a forwarding address data base. Then step 212 stores the routing code from the addressee record data base 70 in the electronic folder and the program returns to the main program.

If step 206 determines that there is more than one address for this zip code, then step 214 gets the partially recognized character string for the street name from the character recognition program 52. Then step 216 accesses the addressee record data base 70 for streets in this zip code. Then step 218 determines if there are multiple streets in this zip code, having characters the same as the recognized/typed street name characters. If there are no streets in this zip code having that condition, then step 222 determines that there has been an error and the string is modified. Alternately, if step 218 determines that there is more than one street name in this zip code under this condition, then step 224 prompts the operator to read the displayed image and type another character for the street name. Then step 224 loops back to step 218 to determine, with the additional typed information from the operator, if there are multiple streets in this zip code having characters as the same as the recognized/typed street name characters.

If step 218 determines if there is one street in this zip code having the characters the same as the recognized/typed street name characters, then step 226 stores the street name in the electronic folder 16. Then step 228 accesses the addressee record data base 70 for this street name and this zip code. Then step 230 determines are there multiple routing codes for this street name and this zip code. If there is no routing code for this street name and this zip code, then step 232 determines if there is an error. If there is one routing code for this street name and this zip code, then step 234 checks for any forwarding address in a forwarding address data base. Then step 236 stores the routing code in the electronic folder 16 and the program returns to the main program.

If step 230 determines that there is more than one routing code for this street name and this zip code, then step 238 gets the partially recognized character string for the street number from the character recognition program 52. Then step 240 accesses the addressee record data base 70 for street numbers for this street in this zip code. Then step 242 determines if there are multiple street numbers for this street in this zip code, having characters the same as the recognized/typed street number characters. If there are no street numbers for this street under this condition, then step 244 determines that there is an error and the string is modified. Alternately, if step 242 determines that there is more than one street number in this zip code, having characters the same as the recognized/typed street number characters, then step 246 prompts the operator to read the displayed image and type another character for the street number. Step 246 then loops back to step 242. Step 242 then once again determines if there are multiple street numbers for this street and this zip code, having characters the same as the recognized/typed street number characters.

If step 242 determines that there is one street number for this street in this zip code, having characters the same as the recognized/typed street number characters, then step 248 stores the street number in the electronic folder 16. Then step 250 accesses the addressee record data base 70 for this street number on this street name and this zip code. Then step 252 determines if there are multiple routing codes for this street number on this street name and this zip code. If step 252 determines there are no routing codes for this street number on this street name and this zip code, then step 254 determines that there is an error. If step 252 determines that there is one routing code for this street number on this street name and this zip code, then a check is made for any forwarding addresses in the forwarding address data base. Then step 258 stores the routing code in the electronic folder 16 and returns to the main program.

If step 252 determines that there is more than one routing code for this street number on this street name and this zip code, then step 260 gets the partially recognized character string for the apartment number from the character recognition program 52. Then step 262 accesses the addressee record data base 70 for apartment numbers at this street number on this street in this zip code. Then step 264 determines if there are multiple apartment numbers at this street number on this street in this zip code, having characters the same as the recognized/typed apartment number characters. If there are no apartment numbers at this street number, then step 266 indicates a zero is an error and the string is modified. Alternately, if step 264 determines that there is more than one apartment number at this street number, then step 268 prompts the operator at the workstation 31 to read the displayed image of the captured image 45' and type another character for the apartment number at the workstation 31. Then step 268 loops back to step 264 to determine if there are multiple apartment numbers at this street number on this street in this zip code, having characters the same as the recognized/typed apartment number characters.

If step 264 determines that there is one apartment number at this street number, then step 270 stores the apartment number in the electronic folder 16. Then step 272 accesses the addressee record data base 70 for this apartment number at this street number on this street name and this zip code. Then step 274 determines if there are more multiple routing codes for this apartment number at this street number on this street name and this zip code. If there is no routing code for this apartment number, then step 276 indicates an error. Alternately, if step 274 determines that there is one routing code for this apartment number at this street number on this street name and this zip code, then a check is made for any forwarding address in the forwarding address data base. Then step 280 stores the routing code in the electronic folder 16 and returns to the main program.

If step 274 determines that there is more than one routing code for this apartment number at this street number on this street name and this zip code, then step 282 accesses the addressee record data base 70 for addressee names at this apartment number at this street number on this street name and this zip code. Then step 284 determines if there are less than five addressee names, then list the names for operator selection at the workstation 31. Then step 286 accesses the addressee record data base for this addressee name which is selected by the operator at the workstation 31. Then step 288 gets the routing code for the selected name and then step 290 checks for any forwarding address in the forwarding address data base. Then step 292 stores the routing code in the electronic folder 16 and returns the main program.

If step 294 determined that there were five or more addressee names, then step 294 transitions to step 296 to get the partially recognized character string for the addressee name from the character recognition program 52. Then step 298 determines if there are multiple addressee names having characters the same as the recognized/typed addressee name characters. If there is no addressee name found in step 298, then step 300 determines that there is an error and the string is modified. Alternately, if step 298 determines that more than one addressee name has the character the same as the recognized/typed addressee name characters, then step 302 prompts the operator at the workstation 31 to read the displayed image and type another character for the addressee name. Then step 302 loops back to step 298 to determine if there are multiple addressee names having characters the same as the recognized/typed addressee name characters.

If step 298 determines that there is one addressee name, then step 304 accesses the addressee data base 70 for this addressee name at this apartment number at this street number on this street name and this zip code. Then step 306 gets the routing code for the addressee name. Then step 308 checks for any forwarding address in the forwarding address data base. Then step 310 stores the routing code in the electronic folder 16 and returns to the main program.

FIG. 7 is a format diagram for the entries into the addressee record data base with routing codes. The format 350 shown in FIG. 7 includes the zip code field 352, the city field, 354, the state field 355, the street name field 356, street number field 358, the floor field 360, the apartment/suite field 362, the route code 364 and the forwarding address field 366.

Figures 2, 8A:
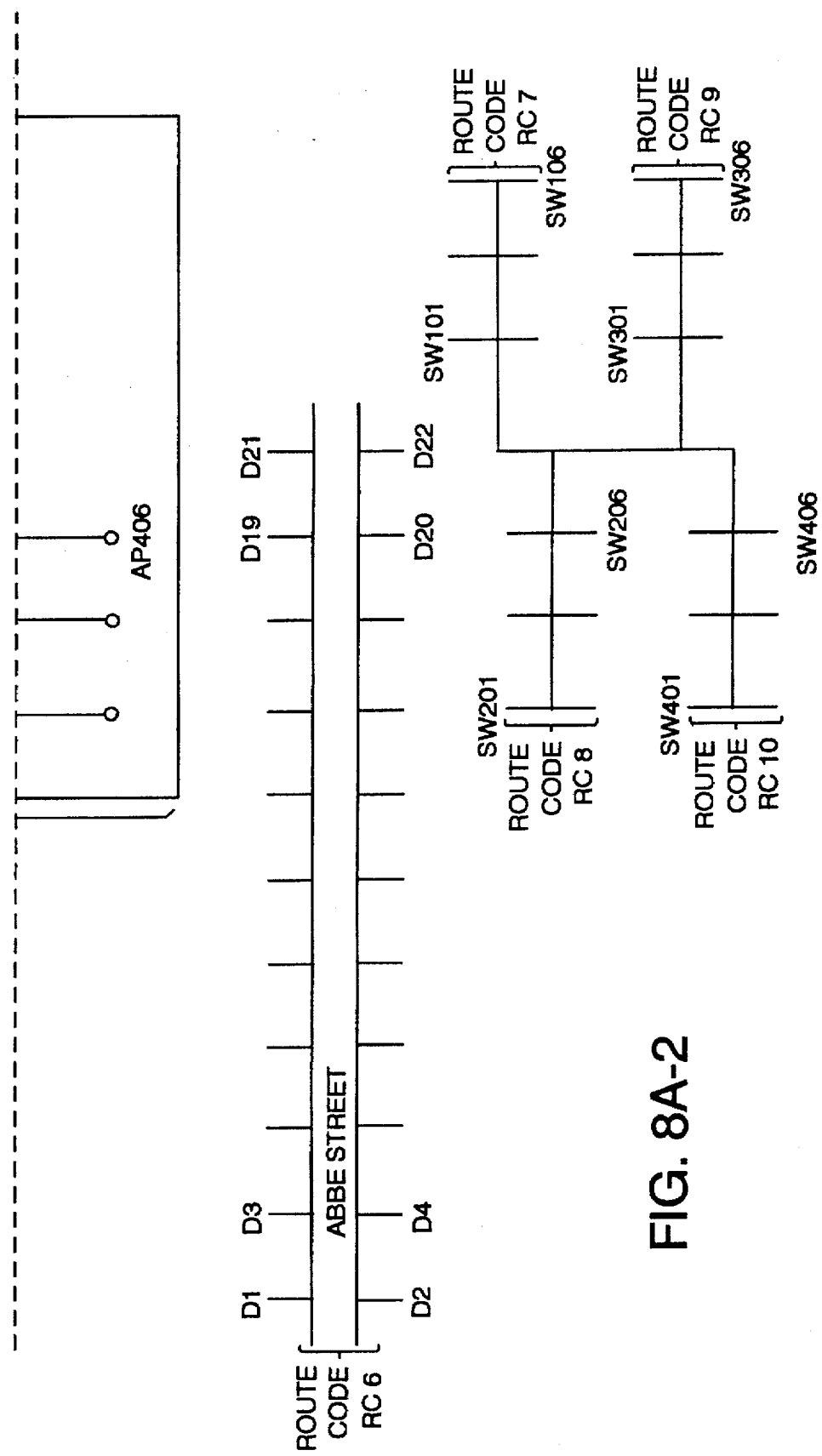
Figure 8B:
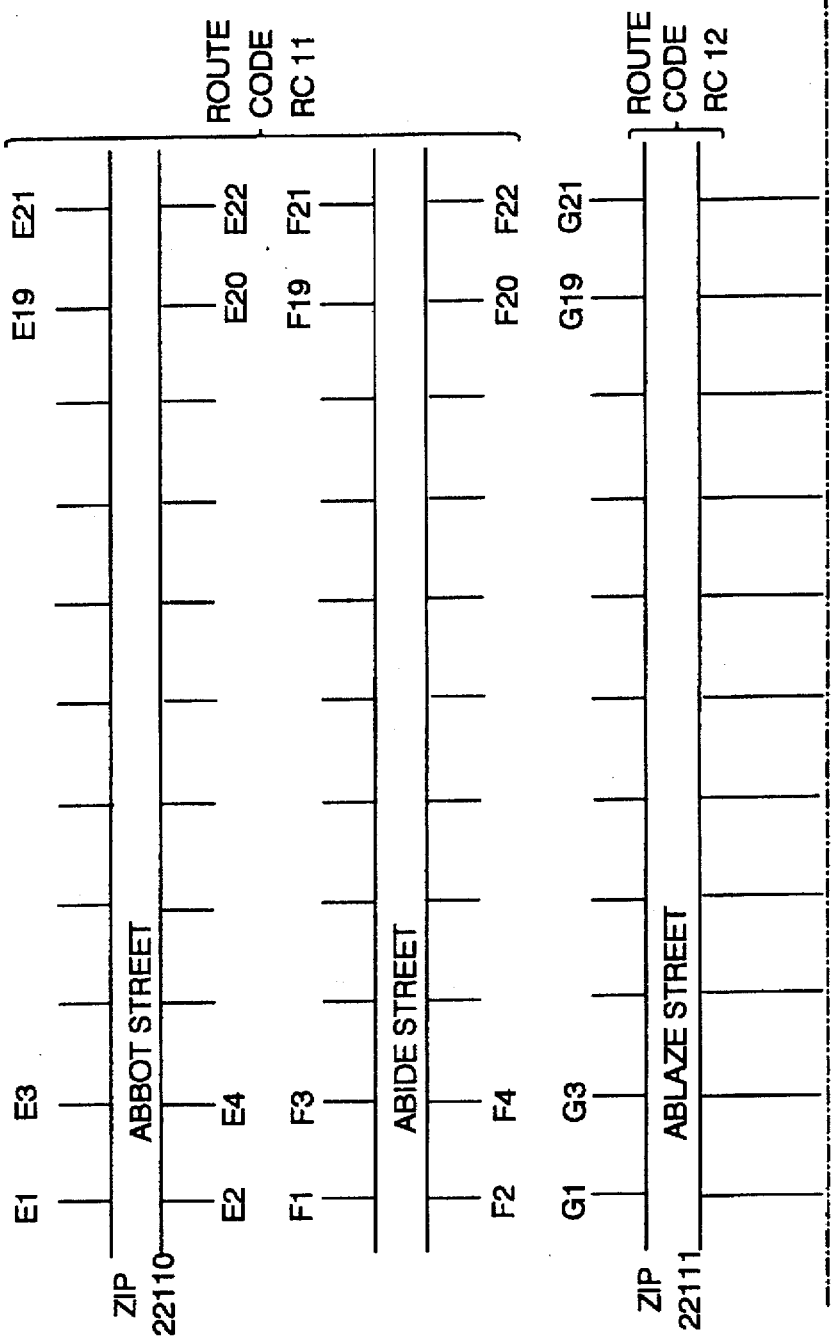
FIG. 8 which consists of FIGS. 8A-1, 8A-2, 8B-1 and 8B-2 shows the street layout for an example city.
Figures 2, 8B:
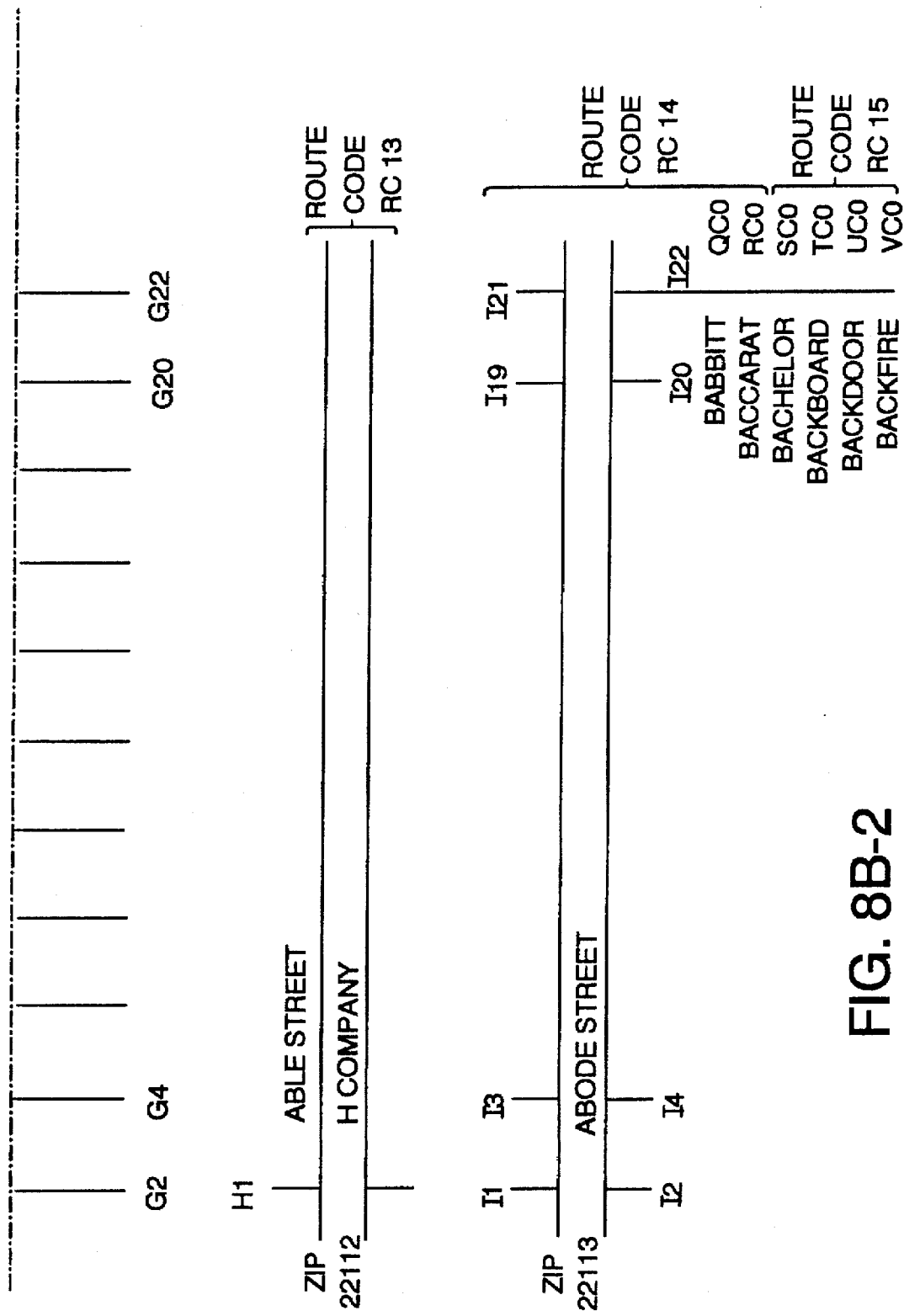

Reference to Table 1 will illustrate an example of an addressee record data base with routing codes 70, as it would be constructed for a city having a street layout shown in FIG. 8. FIG. 8 shows the street named Abacus Street which has addresses A1–A22 and has a single route code RC1. FIG. 8 shows another street named Abalone Street with addresses B1 through B22. B1–B21, the odd addresses have a route code RC2 and B2–B23, the even addresses have route code RC3. Another street is Abatis Street which has addresses C1–C21 which are route code RC4. There is a small housing development at C22 which is an apartment complex with apartments AP101–AP106, and which all come within route code RC5. Another street is Abbe Street which has addressees D1–D21 having a first route code RC6 and at address D22, there is a building with several floors and the first floor with suites 101–106 have a route code RC7, the second floor with suites 206–206 have a route code RC8, third floor with suites 301–306 have a route code RC9 and fourth floor with suites 401–406 have a route code RC10. Another street in FIG. 8 is Abbot Street having addresses E1–E22. Another street is Abide Street which has addresses F1–F22. Both Abbot Street and Abide Street come within the route code RC11. Another street is Ablaze Street which has addresses G1–G22 and conforms to route code RC12. Another street is Able Street which has a single address H1 corresponding to route code RC13. Another street is the Abode Street which has addresses I1–I21 within route code RC14. Abode Street also has address I22 which is a small community with the first two members of the community Babbitt and Baccarat addressee names coming within route code RC14, whereas four additional addressee names Bachelor, Backboard, Backdoor and Backfire come with route code RC15.

Turning now to Table 1 which is the addressee record data base with routing codes 70 which covers the street layout for the city shown in FIG. 8.

The system enables a keyboard operator to input a minimum amount of address information while allowing machine sortation to separate mail pieces to the full specification of the sort scheme at the origin and destination post offices, respectively. This contrasts with the rekeying of the entire address.

Table 2 shows the steps carried out by the contextual predictive keying method whose flow diagram is in FIG. 4, as it is applied to the example in Table 1 and FIG. 8. In particular, Table 2 shows an address block image 45' which reads "A. B. Smith, 3 Abalone Street, BT City, Va. 22153." This is the address block image 45' which would appear on the workstation 31 in FIG. 2. Table 2 also shows the OCR output error string which is "3 A****** Street," which would appear on the display of the workstation 31 of FIG. 2.

Table 2 shows that step 204 accesses the addressee record data base for the zip code "22153." Then step 218 determines that there are seven streets in this zip code having characters the same as the recognized characters in the street name.

Then Table 2 shows that step 224 prompts the operator to read the displayed image of the recognized portion of the street name, and to type a character, the operator will type the character "b." Then in step 218 it is determined that there are still seven streets Which are the same as the recognized and typed characters.

Then step 224 prompts the operator to type another character, in this case it will be a "a." Then step 218 determines if there are still three streets which have the same characters as the recognized and typed characters. Then step 224 prompts the operator to type another character and the operator types a "1."

Now step 218 determines if there is only one street that has characters the same as the recognized and typed characters. Then Table 2 that step 226 stores the street name "Abalone" in accordance with the invention. It is seen here that the operator did not have to type all of the characters in the street name.

Then Table 2 shows that step 230 determines that there are two route codes for this street name. Then step 238 reads the street number which was successfully read as "3." Step 248 stores the street number "3." Step 252 determines that there is now only one route code for the street number of "3" and the street name "Abalone" in this zip code.

Then step 256 determines if there is a forwarding address, and there is no forwarding address. Therefore step 258 stores the route code "2." Then in step 136 of FIG. 3B, Table 2 shows that the electronic folder is transmitted to the destination post office. Thus it is seen from the example in Table 2 that only a minimum amount of typing is necessary by the operator to provide the necessary and sufficient information to sort the mail piece down to the routing code for the destination region post office.

A further example will help illustrate the problem. A person may have a home address requiring a minimum amount of address information because of the sparse population of postal recipients in his neighborhood or the lack of sufficient machine sorting capacity which results all destination mail addressed to his neighborhood to be lumped into a single packet for a single mail carrier. This is to be contrasted with the circumstance where the same person is to receive mail at his business address which is in a building populated by many other people in a business district having a high population density or adequate machine sorting capacity. In the business scenario, in order to successfully sort a mail piece down to the final mechanized sorting level, additional lines of information from the destination address field on the mail piece must be input by the keyboard operator.

Combining this recognition with the inherent redundancy of information in written communication, it is an object of the invention to infer from a minimum number of keystrokes for a corresponding information type such as zip code or alternately street name, the balance of the characters necessary to complete that unit of data and other, redundant data uniquely identified by the completed field. For example, if a zip code accurately recognized, uniquely identifies both a city and a state, then it is unnecessary to type in the name of the city and the state where the zip code is typed in by the operator. The circumstance under which the zip code would be typed in by the operator is where in an optical character recognition environment, the zip code was misrecognized or where the zip code was handwritten and not recognizable. It is then up to the human operator to read the zip code on the front of the mail piece and key in characters for the zip code. Similarly, but more importantly, now that the zip code has been entered by the operator, and the city and state inferred because they are uniquely identified, if there has been a misread of the street name by the optical character recognition equipment, in accordance with the invention, the operator can begin to type in the characters of the street name. Because there will come a point in the number of characters entered at which the name will be uniquely identified within the zip code area, the operator will be signaled to no longer type further characters for the street name, the rest of those characters being supplied by the system.

Further in accordance with the invention, now that the system has inferred the city name, state name and the street name merely from the operator having typed in the zip code and a small portion of the street name, this system will determine whether this amount of information is sufficient to allow final sorting of the mail piece at the destination postal office. This is accomplished by the system being able to access the final sorting level information for mechanical separation and from this sorting information, the operator and the system have assembled an address kernel comprising the characters input from the keyboard and the balance of the characters inferred by the system resulting in, for this example, zip code, city, state and street name. In accordance with the invention, the address kernel is determined by the system to be either sufficient or not sufficient in accomplishing a sorting of the mail piece down to the mechanical final sort level at the destination post office. The address kernel may be sufficient for the purpose of sorting to a residential neighborhood having a sparse population, but the same address kernel for the same addressee may be insufficient for a mail piece directed to that addressee at his business's address, which is a more densely populated neighborhood. The more densely populated neighborhood will, typically, be subject to a finer sorting breakout requiring information from additional lines of the address on the mail piece to achieve a mechanical sort down to the final sorting level.

In order to accomplish this, the invention provides the rekeying station with access to the final level sorting information for all destination postal offices. In order to achieve this, an address directory stored in the host system is organized by records which. Each record includes the state, city, zip code, street name, street number, building floor, company name, office number, and addressee name, where necessary. In addition, each record will include information indicating which combinations of those respective data fields will provide the unique, sufficient information to mechanically sort down to the final sorting level.

Although a specific embodiment of the invention has been disclosed, it will be understood by those having skill in the art that changes can be made to that specific embodiment without departing from the spirit and the scope of the invention.

TABLE 1

|     | Zip Code | City | Street Name | Street No. | Floor | Apt/Su | Rte Code | Fwd X |
|-----|----------|------|-------------|------------|-------|--------|----------|-------|
| A1  | 22110    | BT   | Abacus      | 1          | —     | —      | 1        |       |
| A2  | 22110    | BT   | Abacus      | 2          | —     | —      | 1        |       |
| .   | 22110    | BT   | Abacus      | .          | —     | —      | .        |       |
| .   |          |      |             | .          |       |        |          |       |
| A21 | 22110    | BT   | Abacus      | 21         | —     | —      | 1        |       |
| A22 | 22110    | BT   | Abacus      | 22         | —     | —      | 1        |       |
| B1  | 22110    | BT   | Abalone     | 1          | —     | —      | 2        |       |
| B2  | 22110    | BT   | Abalone     | 2          | —     | —      | 3        |       |
| B3  | 22110    | BT   | Abalone     | 3          | —     | —      | 2        |       |
| B4  | 22110    | BT   | Abalone     | 4          | —     | —      | 3        |       |
| .   | 22110    | BT   | Abalone     | .          | —     | —      | .        |       |
| .   |          |      |             | .          |       |        |          |       |
| B19 | 22110    | BT   | Abalone     | 19         | —     | —      | 2        |       |
| B20 | 22110    | BT   | Abalone     | 20         | —     | —      | 3        |       |
| B21 | 22110    | BT   | Abalone     | 21         | —     | —      | 2        |       |
| B22 | 22110    | BT   | Abalone     | 22         | —     | —      | 3        |       |
| C1  | 22110    | BT   | Abatis      | 1          | —     | —      | 4        |       |
| C2  | 22110    | BT   | Abatis      | 2          | —     | —      | 4        |       |
| .   | 22110    | BT   | Abatis      | .          | —     | —      | .        |       |
| .   |          |      |             | .          |       |        |          |       |
| C20 | 22110    | BT   | Abatis      | 20         | —     | —      | 4        |       |
| C21 | 22110    | BT   | Abatis      | 21         | —     | —      | 4        |       |
| C22 | 22110    | BT   | Abatis      | 22         | 1     | 101    | 5        |       |
| C22 | 22110    | BT   | Abatis      | 22         | 1     | 102    | 5        |       |
| C22 | 22110    | BT   | Abatis      | 22         | 1     | 103    | $       |       |
| .   | 22110    | BT   | Abatis      | .          | .     | .      | .        |       |
| .   |          |      |             | .          |       |        |          |       |
| C22 | 22110    | BT   | Abatis      | 22         | 4     | 405    | 5        |       |
| C22 | 22110    | BT   | Abatis      | 22         | 4     | 406    |          |       |
| D1  | 22110    | BT   | Abbe        | 1          | —     | —      | 6        |       |
| D2  | 22110    | BT   | Abbe        | 2          | —     | —      | 6        |       |
| .   | 22110    | BT   | Abbe        | .          | —     | —      | .        |       |
| .   |          |      |             | .          |       |        |          |       |
| D20 | 22110    | BT   | Abbe        | 20         | —     | —      | 6        |       |
| D21 | 22110    | BT   | Abbe        | 21         | —     | —      | 6        |       |
| D22 | 22110    | BT   | Abbe        | 22         | 1     | 101    | 7        |       |
| D22 | 22110    | BT   | Abbe        | 22         | 1     | 102    | 7        |       |
| D22 | 22110    | BT   | Abbe        | 22         | .     | .      | .        |       |

TABLE 1-continued

|  | Zip Code | City | Street Name | Street No. | Floor | Apt/Su | Rte Code | Fwd X |
|---|---|---|---|---|---|---|---|---|
|  |  |  |  |  | . | . | . |  |
|  |  |  |  |  | . | . | . |  |
|  |  |  |  |  | . | . | . |  |
| D22 | 22110 | BT | Abbe | 22 | 1 | 106 | 7 |  |
| D22 | 22110 | BT | Abbe | 22 | 2 | 201 | 8 |  |
| D22 | 22110 | BT | Abbe | 22 | 2 | 202 | 8 |  |
| D22 | 22110 | BT | Abbe | 22 | . | . | . |  |
|  |  |  |  |  | . | . | . |  |
|  |  |  |  |  | . | . | . |  |
| D22 | 22110 | BT | Abbe | 22 | 2 | 206 | 8 |  |
| D22 | 22110 | BT | Abbe | 22 | 3 | 301 | 9 |  |
| D22 | 22110 | BT | Abbe | 22 | 3 | 302 | 9 |  |
| D22 | 22110 | BT | Abbe | 22 | . | . | . |  |
|  |  |  |  |  | . | . | . |  |
|  |  |  |  |  | . | . | . |  |
| D22 | 22110 | BT | Abbe | 22 | 3 | 306 | 9 |  |
| D22 | 22110 | BT | Abbe | 22 | 4 | 401 | 10 |  |
| D22 | 22110 | BT | Abbe | 22 | 4 | 402 | 10 |  |
| D22 | 22110 | BT | Abbe | 22 | . | . | . |  |
|  |  |  |  |  | . | . | . |  |
|  |  |  |  |  | . | . | . |  |
| D22 | 22110 | BT | Abbe | 22 | 4 | 406 | 10 |  |
| E1 | 22110 | BT | Abbot | 1 | — | — | 11 |  |
| E2 | 22110 | BT | Abbot | 2 | — | — | 11 |  |
| . | 22110 | BT | Abbot | . | — | — | . |  |
| . |  |  |  | . |  |  | . |  |
| . |  |  |  | . |  |  | . |  |
| E21 | 22110 | BT | Abbot | 21 | — | — | 11 |  |
| E22 | 22110 | BT | Abbot | 22 | — | — | 11 |  |
| F1 | 22110 | BT | Abide | 1 | — | — | 11 |  |
| F2 | 22110 | BT | Abide | 2 | — | — | 11 |  |
| . | 22110 | BT | Abide | . | — | — | . |  |
| . |  |  |  | . |  |  | . |  |
| . |  |  |  | . |  |  | . |  |
| F21 | 22110 | BT | Abide | 21 | — | — | 11 |  |
| F22 | 22110 | BT | Abide | 22 | — | — | 11 |  |
| G1 | 22111 | BT | Ablaze | 1 | — | — | 12 |  |
| G2 | 22111 | BT | Ablaze | 2 | — | — | 12 |  |
| . | 22111 | BT | Ablaze | . | — | — | . |  |
| . |  |  |  | . |  |  | . |  |
| . |  |  |  | . |  |  | . |  |
| G21 | 22111 | BT | Ablaze | 21 | — | — | 12 |  |
| G22 | 22111 | BT | Ablaze | 22 | — | — | 12 |  |
| H1 | 22112 | BT | Able | 1 | — | — | 13 |  |
| I1 | 22113 | BT | Abode | 1 | — | — | 14 |  |
| I2 | 22113 | BT | Abode | 2 | — | — | 14 |  |
| . | 22113 | BT | Abode | . | — | — | . |  |
| . |  |  |  | . |  |  | . |  |
| . |  |  |  | . |  |  | . |  |
| I21 | 22113 | BT | Abode | 21 | — | — | 14 |  |
| I22 | 22113 | BT | Abode | 22 | 1 | Babbitt | 14 |  |
| I22 | 22113 | BT | Abode | 22 | 1 | Baccarat | 14 |  |
| I22 | 22113 | BT | Abode | 22 | 1 | Bachelor | 15 |  |
| I22 | 22113 | BT | Abode | 22 | 1 | Backboard | 15 |  |
| I22 | 22113 | BT | Abode | 22 | 1 | Backdoor | 15 |  |
| I22 | 22113 | BT | Abode | 22 | 1 | Backfire | 15 |  |

TABLE 2

| Example | |
|---|---|
| Address Block Image 45': | A. B. Smith |
|  | 3 Abalone Street |
|  | BT City, VA 22153 |
| OCR Output Error String: | 3 A****** Street |
| Step 204: ACCESS ADDRESSEE | |
| RECORD DATA BASE FOR ZIP CODE | |
| Step 218: ARE THERE MULTIPLE | |
| STREETS IN THIS ZIP CODE, | |
| HAVING CHARACTERS THE SAME AS | |
| THE RECOGNIZED/TYPED STREET | |
| NAME CHARACTERS? | Yes, 7 streets |
| Step 224: PROMPT OPERATOR TO | |
| READ THE DISPLAYED IMAGE AND | |
| TYPE ANOTHER CHARACTER | |
| FOR THE STREET NAME: | Type "b" to get "Ab" |
| Step 218: MULTIPLE STREETS? | Yes, 7 streets |
| Step 224: TYPE ANOTHER: | Type "a" to get "Aba" |
| Step 218: MULTIPLE STREETS? | Yes, 3 streets |
| Step 224: TYPE ANOTHER: | Type "1" to get "Abal" |
| Step 218: MULTIPLE STREETS? | No, one street |
| Step 226: Store Street Name | "Abalone" |
| Step 230: Multiple Route Codes? | Yes, 2 route codes |
| Step 238: Read Street Number | "3" |
| Step 248: Store Street Number | "3" |

TABLE 2-continued

| Example | |
| --- | --- |
| Step 252: Multiple Route Codes? | No, one route code |
| Step 256: Any Forward Address? | No |
| Step 258: Store Route Code | "2" |
| Step 136: Transmit Electronic Folder to Destination Region PO | |

What is claimed is:

1. A data processing system to optimize the correction of address information of mail, comprising:

a rekeying station with access to final level sorting information for all destination postal offices;

a storage coupled to said rekeying station, said storage including an electronic folder, a predictive keying program, and an address directory organized by records which include the state, city, zip code, street name, street number, building floor, company name, office number, and addressee name, the records further including information indicating which combinations of those respective data fields provide unique, sufficient information to mechanically sort down to the final sorting level, and means included in the keying station for activating the predictive keying program to interact with the records to optimize the correction of address information of mail in terms of the address directory for the mail, the predictive keying program generating a routing code and entering the routing code into the folder for the final sort of the mail.

2. The system of claim 1 wherein said storage is included in said rekeying station.

3. The system of claim 1 wherein said storage is a part of a host system which is coupled to said rekeying station.

4. The system of claim 1 wherein said storage is a storage server coupled to said rekeying station over a local area network.

5. A data processing system to optimize the correction of address information of mail, comprising:

a rekeying station with access to final level sorting information for destination postal offices;

a storage coupled to said rekeying station, said storage including an electronic folder, a predictive keying program, and an address directory organized by records which include addressee information and information indicating which portions of said addressee information provide unique, sufficient information to mechanically sort mail down to a final sorting level, and an operator station means included in the keying station for displaying images of misrecognized address information and activating the predictive keying program as an operator keys missing address information into the system, the predictive keying program limiting the information the operator keys into the system to optimize the correction of address information of mail in terms of the address directory and generating a routing code for entry into the electronic folder for the final sort level of the mail.

6. The system of claim 5 wherein said storage is included in said rekeying station.

7. The system of claim 5 wherein said storage is a part of a host system which is coupled to said rekeying station.

8. The system of claim 5 wherein said storage is a storage server coupled to said rekeying station over a local area network.

9. A data processing method to optimize the correction of address information of mail using processing apparatus including a processor, storage for the processor, the storage containing an electronic folder, addressee record data base and character recognition programs, comprising:

organizing records in the addressee record data base to include state, city, zip code, street name, street number, building floor, company name, office number, and addressee name, the records further including information indicating which combinations of those respective data fields provide unique, sufficient information to mechanically sort down to the final sorting level;

activating a predictive keying program to interact with the records to optimize the correction of address information of mail in terms of the address directory for the mail:

getting a postal zip code from the address information in the electronic folder for accessing the addressee record data base;

accessing the address information in the addressee record data base for a street name in the zip code;

getting from the character recognition program a partially recognized character string for a street name and generating the full street name from the addressee record data base using the partially recognized character string for the street name;

accessing the address information for an addressee record data base for streets in the zip code;

storing a street name from the data base in said electronic folder;

accessing addressee record data base for streets in the zip code;

generating a routing code for the street name and zip code stored in the electronic folder;

storing the routing code in said electronic folder, and sorting a mail piece corresponding to said electronic folder down to a final sorting level, using said routing code.

10. The method of claim 9 which further comprises the steps of:

getting a partially recognized character string for said street number;

accessing said addressee record data base for street numbers for the street in the zip code;

prompting an operator to read a displayed image of the addressee's address, said operator typing another character for the street number;

determining if there are multiple street numbers for this street in the zip code having characters the same as the recognized and typed street number characters;

storing the street number in said electronic folder;

accessing said addressee record data base for the street number on the steet name and the zip code; storing a routing code for said street number, street name and zip code in said electronic folder; sorting a mail piece down to final sorting level, using said routing code.

11. The method of claim 10 which further comprises the steps of:

getting a partially recognized character string for an apartment number;

accessing said addressee record data base for apartment numbers at this street number on this street in this zip code;

prompting an operator to read said displayed image, said operator typing another character for the apartment number;

determining if there are multiple apartment numbers at this street number on this street in this zip code, having characters the same as the recognized and typed apartment number characters;

storing the apartment number in said electronic folder;

accessing said addressee record data base for this apartment number at this street number on the street name and this zip code;

storing a routing code for the apartment number, street number, street name and zip code in said electronic folder;

sorting a mail piece corresponding to said electronic folder down to a final sorting level, using said routing code.

12. The method of claim 11 which further comprises the steps of:

accessing the addressee record data base for addressee names at this apartment number at this street number on this street name and this zip code;

getting a routing code for a selected one addressee name;

storing a routing code for said addressee names, street number and zip code in said electronic folder;

sorting a mail piece corresponding to said electronic folder down to a final sorting level, using said routing code.

13. The method of claim 12, which further comprises the steps of:

checking for any forwarding address for the addressee prior to storing said routing code in said electronic folder;

if there is a forwarding address, accessing said forwarding address and the corresponding routing code;

storing said corresponding routing code in said electronic folder;

forwarding a mail piece corresponding to said electronic folder to a forwarding destination address.

14. A data processing system for improved processing of mail having misrecognized address information, comprising:

a processor, a storage device, a memory, the memory containing an electronic folder having unfilled space for mail routing information, a predictive keying program, an address record data base with routing codes, a character recognition program, and an operating system for the processor;

means for organizing records in the addressee record data base to include state, city, zip code, street name, street number, building floor, company name, office number, and addressee name, the records further including information indicating which combinations of those respective data fields provide unite, sufficient information to mechanically sort down to the final sorting level:

an operator station for displaying images of misrecognized addresses generated by the character recognition program;

means for activating the predictive keying program to interact with the records to optimize the correction of address information of mail in terms of the address directory for the mail as an operator keys into the system missing address information for the mail in terms of the address record data base, and means for generating and storing a routing code in the space available in the electronic folder for final sorting of the mail.

15. The system of claim 14 wherein the predictive keying program interacts with the address record data base and routing codes while prompting the operator to enter missing address information.

16. The system of claim 15 further wherein the predictive keying program checks the address information for a forwarding address.

* * * * *